(12) United States Patent
Kawaguchi et al.

(10) Patent No.: US 7,127,614 B2
(45) Date of Patent: Oct. 24, 2006

(54) JUSTIFICATION AUTHENTICATING SYSTEM, PERSONAL CERTIFICATE ISSUING SYSTEM, AND PERSONAL CERTIFICATE

(75) Inventors: Yuichi Kawaguchi, Fukuoka-Ken (JP); Yuji Shimizu, Koga (JP); Shinichi Tsumori, Dogaki (JP); Takashi Katsura, Fukuoka (JP); Hisashi Inoue, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 836 days.

(21) Appl. No.: 09/885,736

(22) Filed: Jun. 20, 2001

(65) Prior Publication Data

US 2001/0054149 A1    Dec. 20, 2001

(30) Foreign Application Priority Data

Jun. 20, 2000    (JP)    ............................. 2000-184866

(51) Int. Cl.
*H04L 9/00* (2006.01)
(52) U.S. Cl. ...................... 713/176; 713/156; 713/175; 713/186
(58) Field of Classification Search ................. 713/176
See application file for complete search history.

(56) References Cited

U.S. PATENT DOCUMENTS

| | | |
|---|---|---|
| 5,354,097 A | 10/1994 | Tel |
| 5,355,411 A | 10/1994 | MacDonald |
| 5,719,939 A | 2/1998 | Tel |
| 6,421,450 B1 * | 7/2002 | Nakano ...................... 382/100 |
| 6,425,081 B1 * | 7/2002 | Iwamura ..................... 713/176 |
| 6,778,678 B1 * | 8/2004 | Podilchuk et al. .......... 382/100 |
| 2001/0037313 A1 * | 11/2001 | Lofgren et al. |

FOREIGN PATENT DOCUMENTS

| | | |
|---|---|---|
| EP | 0 581 317 A2 | 2/1994 |
| EP | 0 859 503 A2 | 8/1998 |
| FR | 2 776 153 A1 | 9/1999 |
| JP | 10275203 | 10/1998 |
| WO | WO-96/36163 A2 | 11/1996 |

OTHER PUBLICATIONS

Zhao J: "a www service to embed and prove digital copyright watermarks"; Proceedings of the European Conference on Multimedia Applications, Services and Techniques; Dec. 31, 1996; pp. 695-709; XP000199921.

* cited by examiner

*Primary Examiner*—Kambiz Zand
(74) *Attorney, Agent, or Firm*—Darby & Darby

(57) ABSTRACT

A justification/authentication personal certificate system stores in a remote database a counterpart of an identifier and a digital watermark contained in the personal certificate. The personal certificate includes the digital watermark embedded in an authentic image such as a facial photograph, a retinal scan, or a fingerprint. When the personal certificate is used, the authentic image is read from the personal certificate, and the digital watermark information is extracted. The digital watermark information and the identifier are compared with the counterparts stored in the database. If the extracted digital watermark information is identical to the information in the database, then the personal certificate is judged to be unjustifiable. In one embodiment, at least one of the identifier and digital watermark are changed each time the system justifies the personal certificate.

12 Claims, 5 Drawing Sheets

JUSTIFICATION AUTHENTICATING SYSTEM, PERSONAL CERTIFICATE ISSUING SYSTEM, AND PERSONAL CERTIFICATE

BACKGROUND OF THE INVENTION

This invention relates to a justification authenticating system, a personal certificate issuing system, and a personal certificate used in these systems.

In general, personal certificates that include authentic images (of a card type or a book type), such as a credit card, cash card, membership card, student identification card, employee ID card, passport, health insurance card, and license, have been widely used. In this specification, the "authentic image" signifies an image by which an individual is identified, such as a photographic image of a face, an image of a fingerprint, or an image of a pupil.

However, incidents are so frequently occurring in which a person who is not the owner of these personal certificates substitutes another authentic image for an authentic image of the owner, and thereby the person unjustly impersonates the true owner. This is a social problem.

As a countermeasure against such counterfeiting, a technique for embedding a digital watermark into a facial photograph has been proposed (see Japanese Unexamined Patent Publication No. Hei-10-275203), the disclosure of which is herein included by reference. According to the digital watermark method, desired data is embedded into an authentic image, which is digital data, as watermark information so as to be indistinguishable to the eye, while permitting normal viewing of the authentic image.

In this technique, the justification of a personal certificate is judged in such a way that a digital watermark embedded in the personal certificate is accurately extracted by the aid of authentication equipment (for example, a card reader).

Here, it is supposed that, when a personal certificate is generally formed, the identifier of the owner of the certificate is "BBB", and information to be added is "AAA", and the digital watermark of "ABABAB" is embedded.

In this case, the digital watermark is read from an authentic image when authenticated. If reading fail, the identification is judged to be unjustifiable. Even if the reading is successful, according to an opposite procedure to the procedure followed when embedded, as a result of excluding the identifier "BBB" from the "ABABAB", the information "AAA" is separated. A judgment is then made as to whether or not the information is correct. As a result, if information is correct, it is judged to be justifiable, and, if not correct, it is judged to be unjustifiable.

However, the above technique is at a disadvantage in that, since the justification is determined only by the data stored on the card, falsification is easily perpetrated if the algorithm for embedding a digital watermark is leaked or revealed. For example, the illegality of an offender B cannot be exposed even if the offender B who stole the credit card of a person A merely pastes a facial photograph in which a digital watermark according to this algorithm is embedded on the facial photograph of the offender B, and the offender B shops with this credit card. Accordingly, the above technique cannot completely avoid problems about security.

OBJECTS AND SUMMARY OF THE INVENTION

It is an object of the present invention to provide a justification authenticating system, a personal certificate issuing system, and a personal certificate used in these systems, each having high security.

Briefly stated, the present invention provides a justification/authentication personal certificate system which stores in a remote database a counterpart of an identifier and a digital watermark contained in the personal certificate. The personal certificate includes the digital watermark embedded in an authentic image such as a facial photograph, a retinal scan, or a fingerprint. When the personal certificate is used, the authentic image is read from the personal certificate, and the digital watermark information is extracted. The digital watermark information and the identifier are compared with the counterparts stored in the database. If the extracted digital watermark information is identical to the information in the database, then the personal certificate is judged to be unjustifiable. In one embodiment, at least one of the identifier and digital watermark are changed each time the system justifies the personal certificate.

According to an embodiment of the invention, there is provided a justification authenticating system comprising: a database for storing an identifier of a personal certificate and digital watermark information related to said identifier, a personal certificate containing said identifier, said personal certificate also containing a readable authentic image in which a digital watermark relative to said identifier is embedded, a read means for reading at least said authentic image from said personal certificate, a watermark information inquiring means for extracting digital watermark information corresponding to said identifier from said authentic image, and a watermark information comparing means for judging whether said digital watermark information extracted by said watermark information inquiring means from said personal certificate is identical to said watermark information stored in said database, if said watermark inquiring means finds identical watermark information m said watermark information from said authentic image and said database, said watermark inquiring means justifies said personal certificate, and if the watermark information from the two sources are not identical, then the watermark inquiring means fails to justify said personal certificate.

According to a feature of the invention, there is provided a personal certificate issuing system comprising: an identifier generating means for generating an identifier unique to a personal certificate, a watermark information generating means for generating digital watermark information corresponding to said identifier, a database for storing said identifier of said personal certificate and said digital watermark information relative to said identifier in relation to each other, a watermark information registering means for storing said identifier generated by said identifier generating means and said digital watermark information generated by said watermark information generating means in said database, an image input means for inputting a raw authentic image, a watermark-embedded image forming means for forming a watermark-embedded authentic image in which said digital watermark is embedded on said authentic image input by said image input means, and a personal certificate that readably carries said authentic image generated by said watermark-embedded image forming means and said identifier generated by said identifier generating means.

According to a further feature of the invention, there is provided a personal certificate comprising: a unique identifier, an authentic image of an authorized user of said personal certificate, said authentic image being viewable by eye, said authentic image containing embedded therein digital watermark information corresponding to said identifier, and means for permitting communication of said identifier and said digital watermark information to a database remote from said personal certificate.

According to a first aspect of the present invention, digital watermark information embedded in an authentic image is stored not only on the authentic image of a personal certificate but also on a database, and therefore only justifiable use is permitted following a comparison of the digital watermark information stored in the database and the digital watermark information extracted from the personal certificate.

For example, since the database itself is not modified even if digital watermark information is embedded expertly in the facial photograph of a personal certificate stolen by the offender B, the comparison with the database fails, and the illegality of the offender B is exposed. That is, compared with a case in which security depends only on the authentic image of the personal certificate, security can be greatly improved.

According to a second aspect of the present invention, in addition to the first aspect of the invention, the digital watermark stored in the information carrier can be read as digital data, and therefore the digital watermark information can be accurately compared.

According to a third aspect of the present invention, in addition to the first aspect of the invention, the information carrier is a semiconductor memory or a magnetic material, and therefore data can be stored without greatly increasing the weight of the personal certificate.

According to a fourth aspect of the present invention, in addition to the first aspect of the invention, the authentic image is printed on printed matter, and therefore the personal certificate is thinner and lighter.

According to a fifth aspect of the present invention, in addition to the first aspect of the invention, random values are included in the digital watermark information. Therefore, persons who attempt falsification or alteration cannot predict the random portion of the information. This increases the difficulty of falsification.

According to a sixth aspect of the present invention, in addition to the first aspect of the invention, the digital watermark information embedded in the facial photograph information of the database and of the personal certificate is updated whenever necessary or desirable. Therefore, infallible measures can be taken against falsification.

According to a seventh aspect of the present invention, in addition to the first aspect of the invention, the database is located at a distance from the place where the personal certificate is used. The data is communicated through a communication network. Thus, the digital watermark information does not leak out as long as access to the database is prevented. Therefore, the security of the system is improved.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Embodiments of the present invention are described hereinafter with reference to the accompanying drawings. First, prior to the description of each embodiment, the relationship among an identifier, digital watermark information, and a database according to the present invention is roughly described with reference to FIG. 5. A case where the photographic image of a face is used as an authentic image is primarily described below.

Figure 5:
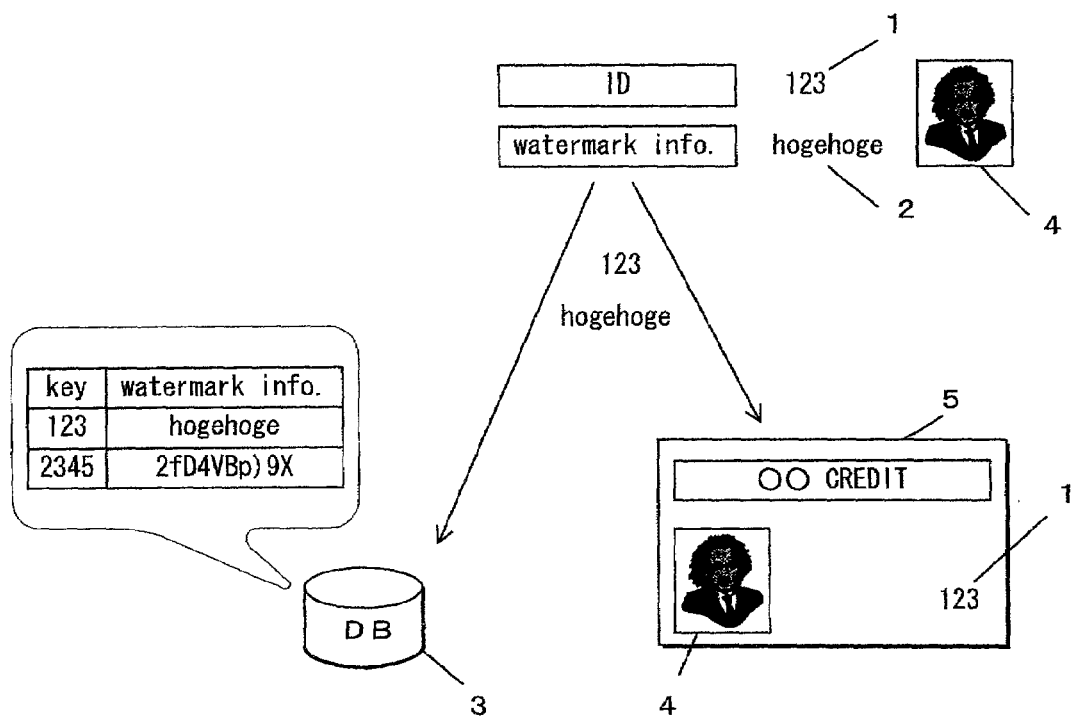
FIG. 5 schematically shows the relationship among a personal certificate, an identifier, a digital watermark, and a database of the same.

As shown in FIG. 5, a personal certificate 5 includes an identifier 1 and an authentic image 4. There is a one-to-one relationship between the identifier 1 and digital watermark information 2 which are stored in a database 3. In this example, for purposes of description, and not as a limitation, the identifier 1 is "123", and the digital watermark information 2 is "hogehoge".

Embodiment 1

Figure 1:
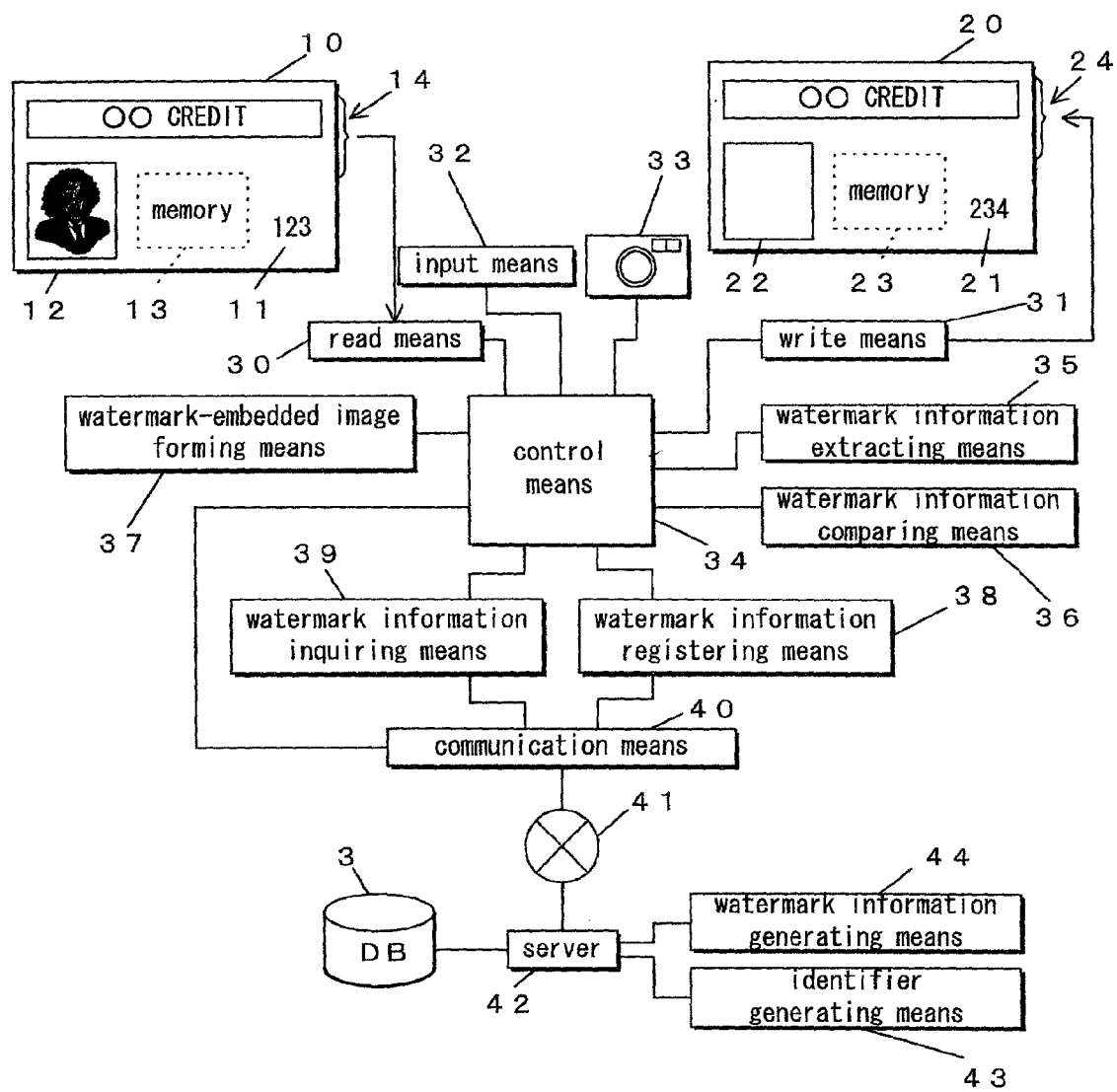
FIG. 1 is a block diagram of a system according to a first embodiment of the present invention.

Referring to FIG. 1, a system according to the first embodiment of the present invention employs a personal certificate 10 shown at the upper left of FIG. 1. The personal certificate 10 is one that has been issued, and is used for authentication. A personal certificate 20 shown at the upper right of FIG. 1 is being prepared for issue, but has not yet been completed for issue.

The completed and issued personal certificate 10 has a display part 12 in which a photograph of a face or the like is displayed, a memory 13 as an information carrier, and an identifier 11(in this embodiment, "123").

The personal certificate 10 further has an input-output port 14 to access the memory 13. If the capacity is large enough to store an image, a magnetic material, such as a magnetic strip, may be used as an information carrier instead of the memory 13.

An authentic image in which digital watermark information is embedded, is stored in the memory 13. The authentic image can be displayed on the display part 12 if necessary. The display part 12 may be, for example, an LCD.

Likewise, the personal certificate 20 being prepared for issue includes an identifier 21 (herein "234"), a display part 22, a memory 23, and an input-output port 24. The personal certificate is constructed in this way.

Next, a system of this embodiment is described. For convenience of explanation, this system is a combination of a justification authenticating system and a personal certificate issuing system However, the authenticating system and the issuing system can be separately constructed.

A read means 30 is connected to the input-output port 14. The connection of the read means 30 may be a wired or wireless connection. The read means 30 reads the authentic image that is stored in the memory 13 and in which digital watermark information is embedded.

A write means 31 is connected to the input-output port 24. The connection of the write means 31 may be a wired or wireless connection. The write means 31 writes into the memory 23 facial photograph information in which digital watermark information is embedded.

An input means 32 accepts information input needed when a personal certificate is authenticated or issued. A digital camera 33 photographs the face of an owner, and outputs an authentic image (digital). A control means 34 controls the above, and other elements, and judges the verification of the personal certificate.

A watermark information extracting means 35 extracts only the digital watermark information from the authentic image read by the read means 30, and returns the digital watermark information to the control means 34.

A watermark information comparing means 36 compares the watermark information obtained from the database 3 with the watermark information extracted by the watermark information extracting means 35, and returns a judgment to the control means 34 on whether or not the two sources of watermark information are identical.

As described later, a watermark-embedded image forming means 37 embeds generated watermark information obtained from a server 42 side into the authentic image photographed by the digital camera 33, and forms an authentic image in which a digital watermark is embedded.

A watermark information registering means 38 requests the server 42 to register an identifier and a digital watermark corresponding to the identifier on the database 3. A watermark information inquiring means 39 sends the identifier to the database 3 through the server 42, and requests watermark information relative to the identifier. A communication means 40 communicates with the server 42 through a communication network 41.

The server 42 is connected to an identifier generating means 43 and a watermark information generating means 44. The identifier generating means 43 accesses the database 3, and generates a unique identifier that has not yet been assigned. The watermark information generating means 44 forms watermark information corresponding to the identifier.

The watermark information is preferably determined arbitrarily. Preferably, the watermark information is based on a random number generator (pseudo-random number generator). With watermark information generated according to random numbers, persons (offenders or their group) who attempt falsification, cannot predict the information in a new watermark based on knowledge of preceding watermarks. This provides an additional level of security for the system. Typically, the watermark information is recorded on the database 3 as text data, and is embedded into the authentic image as a digital watermark.

Although the authentic image is obtained by photography using the digital camera 33 in the example of FIG. 1, the authentic image may be input by any convenient input device such as, for example, reading in printed matter with an image scanner or the like. If a fingerprint image or a pupil image, instead of a face image, is employed as the authentic image, an input means suitable for such an image is used, as a matter of course.

The identifier generating means 43 and the watermark information generating means 44 maybe disposed on the control means 34 side (i.e., the client side when seen from the server 42), instead of on the server 42 side.

Embodiment 2

Figure 2:
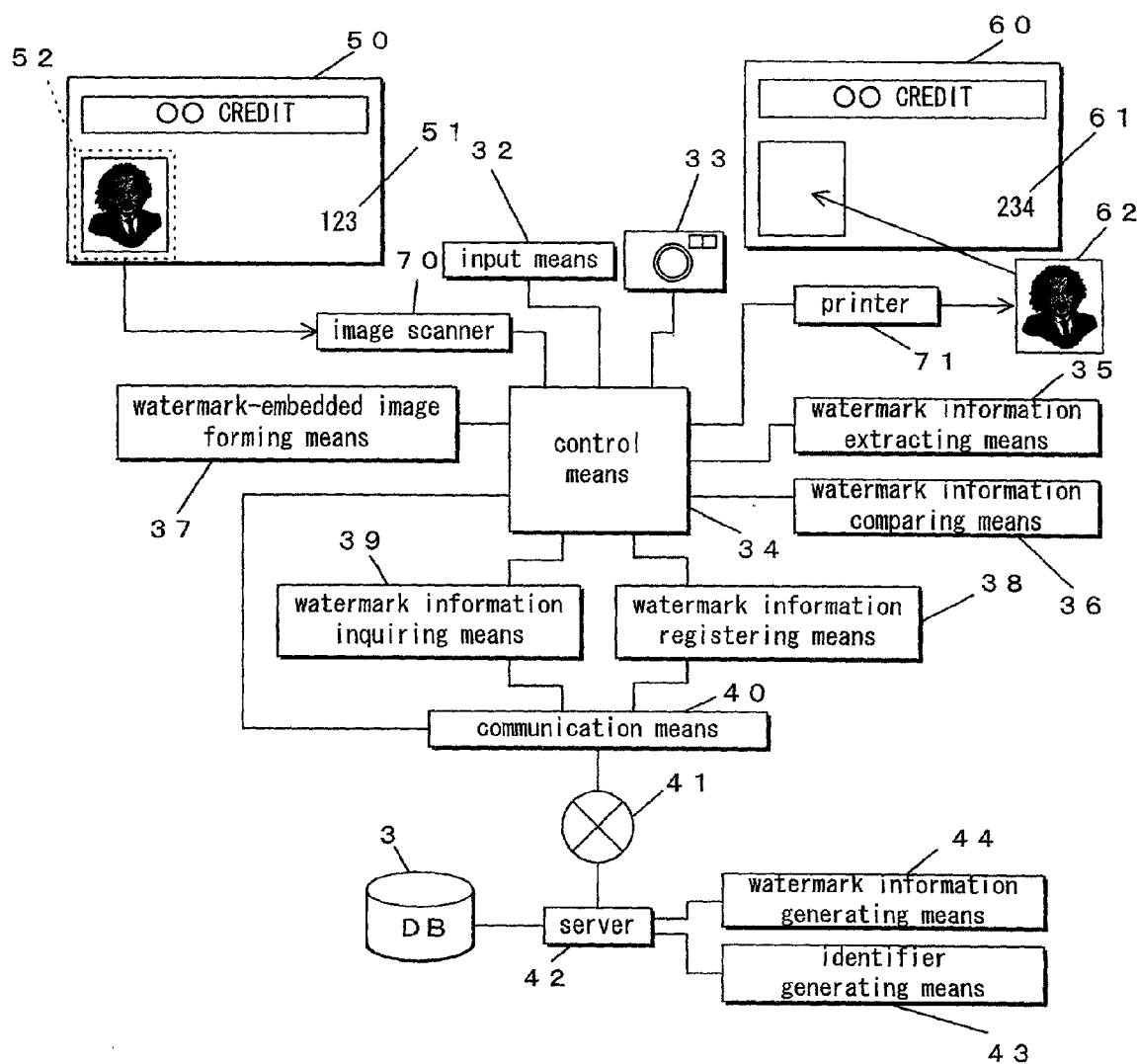
FIG. 2 is a block diagram of a system according to a second embodiment of the present invention.

Next, a system according to a second embodiment of the present invention is described with reference to FIG. 2. In this system, a personal certificate does not include a memory as an information carrier. This embodiment differs from that of FIG. 1 in the following respect.

Although an identifier 51 (herein "123") is displayed on a personal certificate 50 for authentication, an information carrier is omitted. Accordingly, an input-output port is not required. Instead of a memory and input-output port, a printed facial photograph 52 is pasted on the personal certificate 50. The printed facial photograph 52 is input through an image scanner 70.

Likewise, although an identifier 61 (herein "234") is displayed on a personal certificate 60 for issue, a memory and an input-output port are also omitted. Instead, a pasting area for a facial photograph 62 is available for pasting therein. Digital watermark information is embedded in the facial photograph 62. The facial photograph 62, together with the digital watermark information is printed on the personal certificate 60 by a printer 71. The resulting facial photograph 62 is pasted on the pasting area of the personal certificate 60. The remaining aspects of the system are identical to the structure of FIG. 1.

Processing

Figure 3:
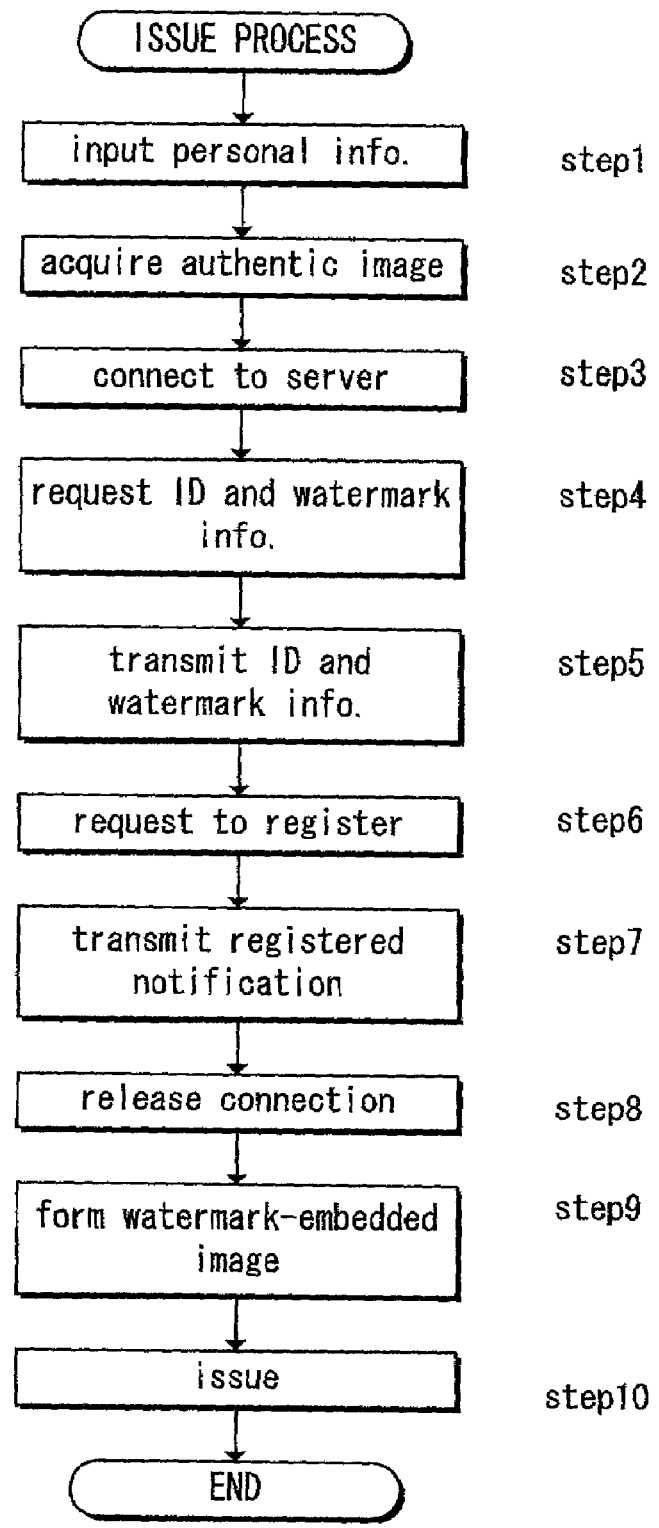
FIG. 3 is a flowchart showing an issuing process according to the first embodiment of the present invention.

Next, the flow of a process for issuing the personal certificate is described hereinafter with reference to FIG. 3. In the second embodiment, the technique of the reading/wring of the authentic image merely differs in the processing itself, and therefore the first embodiment is primarily described.

First, the operator of this system or the owner of the personal certificate inputs necessary personal information to the system using the input means 32 (step 1). Thereafter, at step 2, the owner's face, corneal pattern, fingerprint, or other identifying pattern, is photographed with the digital camera 33, scanner, or other device, to acquire an authentic image.

At step 3, the control means 34 connects to the server 42 through the communication network 41 using the communication means 40.

Thereafter, at step 4, the control means 34 requests the server 42 to generate an identifier and watermark information corresponding to this identifier through the communication means 40.

In response to this, the identifier generating means 43 on the server 42 side accesses the database 3, and generates a new identifier that has not yet been assigned. The watermark information generating means 44 generates watermark information corresponding to this new identifier. The identifier and the watermark information are transmitted to the control means 34 (step 5).

The control means 34 receives them and requests the watermark information registering means 38 to register the received identifier and watermark information on the database 3 (step 6). In response to this demand, the server 42 stores the information in the database 3. Thereafter notification is transmitted to the control means 34 that the registration has been completed (step 7).

Upon receiving this notification, the control means 34 releases the connection with the server 42 (step 8), and gives the received watermark information and the authentic image obtained from the digital camera 33 to the watermark-embedded image forming means 37, and thereby a watermark-embedded image is formed (step 9).

At step 10, the watermark-embedded image formed as described above is transmitted to the write means 31. The write means 31 writes this image into the memory 23 through the input-output port 24, and the authentic image is displayed on the display part 22 when necessary. This completes the issuing process.

Figure 4:
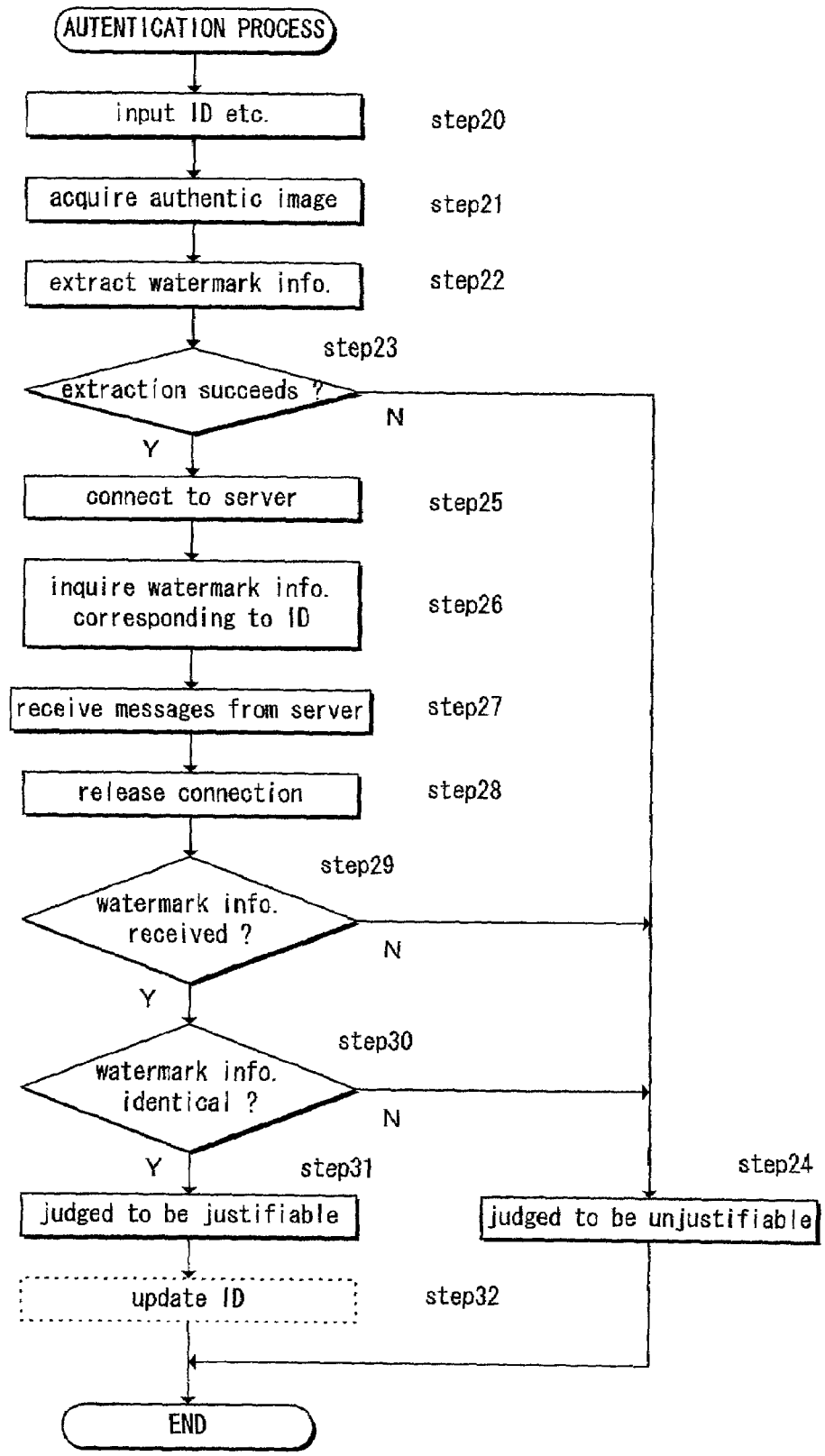
FIG. 4 is a flowchart showing an authentication process of the present invention.

Next, the authentication process is described with reference to FIG. 4. The personal certificate 10 that has been issued is inserted into the read means 30. First, the read means 30 reads an identifier 11 (herein "123") from the personal certificate 10 (step 20). The identifier may be input by any convenient device such as, for example, with the input means 32.

Thereafter, at step 21, the read means 30 reads the authentic image that is stored in the memory 13 and in which digital watermark information is surely embedded, through the input-output port 14.

Thereafter, at step 22, the control means 34 transmits the obtained authentic image to the watermark information extracting means 35, and causes the extracting means 35 to extract watermark information from the authentic image. If this extraction fails (step 23), the control means 34 judges that the personal certificate 10 is unjustifiable (step 24), and terminates the processing.

On the other hand, if the extraction of the watermark information succeeds, the control means 34 connects to the server 42 through the communication means 40 (step 25).

The control means 34 transmits the identifier 11 that has been read from the personal certificate to the watermark information inquiring means 39, and causes the inquiring means 39 to acquire the watermark information corresponding to the identifier 11 (step 26).

When receiving this inquiry, the server 42 retrieves the watermark information corresponding to the identifier in the database 3. If the watermark information is not found, the server 42 sends a message that the corresponding information is not found. If the watermark information is found, the server 42 returns the found watermark information to the control means 34 (step 27).

When the control means 34 receives the information from the server 42, the control means 34 releases the connection (step 28). If the control means 34 receives the message that the watermark information is not found (step 29), it is judged that the personal certificate 10 is unjustifiable (step 24), and the processing is terminated.

On the other hand, when receiving the watermark information, the control means 34 transmits the watermark information extracted by the watermark information extracting means 35 and the watermark information received from the server 42 at this time to the watermark information comparing means 36 for a comparison. If the watermark information from the two sources are found to be non-identical in the comparison made by the watermark information comparing means 36, the control means 34 determines that the personal certificate 10 is unjustifiable (step 24), and terminates the processing.

On the other hand, if the watermark information from the two sources are found to be identical in the comparison, the control means 34 determines that the personal certificate 10 is justifiable (step 31), and completes the processing.

Preferably, when the watermark is judged to be justifiable, the same process as the main part of FIG. 3 is carried out once again at step 32, and the watermark information corresponding to this identifier is updated (step 32). As a matter of course, the update means updates both the digital watermark embedded in the authentic image of the personal certificate 10 and the digital watermark in the database 3 (note that these digital watermarks are caused to be identical). If so, the digital watermark is updated whenever the authentication process succeeds. This adds an additional defense against falsification or forgery.

As described above, in the present invention, the digital watermark embedded in the authentic image of the personal certificate does not depend only on proof by authentication equipment. Instead, it compares the digital watermark stored in the database remote from the personal certificate or the authentication equipment with the digital watermark on the personal certificate. Therefore, a preventive system against falsification or against other unjustifiable use is constructed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A justification authenticating system comprising:
   a database for storing an identifier of a personal certificate and digital watermark information related to said identifier;
   a personal certificate containing said identifier;
   said personal certificate also containing a readable authentic image in which a digital watermark relative to said identifier is embedded;
   a read unit operable to read at least said authentic image from said personal certificate;
   a watermark information inquiring unit operable to extract digital watermark information corresponding to said identifier from said authentic image; and
   a watermark information comparing unit operable to judge whether said digital watermark information extracted by said watermark information inquiring unit from said personal certificate is identical to said watermark information stored in said database; and
   a unit operable to update said digital watermark information stored in said database and said digital watermark information embedded in said authentic image in said personal certificate each time said watermark information inquiring unit judges said digital watermark information to be justifiable.

2. The justification authenticating system of claim 1, wherein said personal certificate includes:
   an information carrier for storing said authentic image; and
   said digital watermark is embedded in said authentic image stored in said information carrier.

3. The justification authenticating system of claim 2, wherein said information carrier is at least one of a semiconductor memory and a magnetic recording material.

4. The justification authenticating system of claim 2, wherein:
   said information carrier includes said authentic image being a printed authentic image affixed to said personal certificate; and
   said read means reads said printed image.

5. The justification authenticating system of claim 1, wherein at least one of said identifier and said digital watermark information includes an element that is randomly generated.

6. The justification authenticating system of claim 1, further comprising:
   a communication device for communicating said watermark information between said watermark information inquiring unit and said database.

7. A personal certificate issuing system comprising:
   an identifier generating unit operable to generate an identifier unique to a personal certificate;
   a watermark information generating unit operable to generate digital watermark information corresponding to said identifier;
   a database for storing said identifier of said personal certificate and said digital watermark information relative to said identifier in relation to each other;
   a watermark information registering unit operable to store said identifier generated by said identifier generating unit and said digital watermark information generated by said watermark information generating unit in said database;

an image input unit operable to input a raw authentic image;

a watermark-embedded image forming unit operable to form a watermark-embedded authentic image in which said digital watermark is embedded on said authentic image input by said image input unit; and a personal certificate that readably carries said authentic image generated by said watermark-embedded image forming unit and said identifier generated by said identifier generating unit;

wherein said digital watermark information stored in said database and embedded in said authentic image of said personal certificate is update according to predetermined timing, and said predetermined timing includes each time said system correctly justifies an authentic image.

8. The personal certificate issuing system of claim 7, wherein:

said personal certificate includes an information carrier for storing said authentic image; and said authentic image includes a digital watermark embedded in said authentic image stored in said information carrier.

9. The personal certificate issuing system of claim 8, wherein said information carrier is at least one of a semiconductor memory and a magnetic material.

10. The personal certificate issuing system of claim 8 wherein:

said information carrier includes said authentic image being a printed authentic image affixed to said personal certificate; and said read means reads said printed authentic image.

11. The personal certificate issuing system of claim 7, wherein at least one of said identifier and said digital watermark information includes an element that is randomly generated.

12. The personal certificate issuing system of claim 7, further comprising:

a communication device for communicating said watermark information between said watermark information inquiring unit and said database.

* * * * *

UNITED STATES PATENT AND TRADEMARK OFFICE
CERTIFICATE OF CORRECTION

PATENT NO. : 7,127,614 B2 Page 1 of 1
APPLICATION NO. : 09/885736
DATED : October 24, 2006
INVENTOR(S) : Yuichi Kawaguchi et al.

It is certified that error appears in the above-identified patent and that said Letters Patent is hereby corrected as shown below:

On the title page, item [75] (Inventors); Line 3; After "Tsumori," delete "Dogaki" and insert -- Oogaki --, therefor.

First Page Col. 2 (foreign patent Documents); Line 4; After "JP 10275203 10/1998" insert -- 17/00 --.

Column 8; Line 47; In Claim 4, after "read" delete "means" and insert -- unit --, therefor.

Column 10; Line 7; In Claim 10, after "claim 8" insert -- , --.

Column 10; Line 12; In Claim 10, after "read" delete "means" and insert -- unit --, therefor.

Signed and Sealed this

Seventeenth Day of April, 2007

JON W. DUDAS
*Director of the United States Patent and Trademark Office*